United States Patent [19]
Crosnier

[11] Patent Number: 5,935,619
[45] Date of Patent: Aug. 10, 1999

[54] EXTRUSION HEAD WITH RECYCLING DEVICE

[75] Inventor: Gérard Crosnier, Ceyrat, France

[73] Assignee: Compagnie Générale des Etablissements Michelin - Michelin & Cie, Clermont-Ferrand Cedex, France

[21] Appl. No.: 08/906,706

[22] Filed: Aug. 6, 1997

[30] Foreign Application Priority Data

Aug. 9, 1996 [FR] France .................................. 96 10186

[51] Int. Cl.[6] ............................ B29C 47/32; B29C 47/72
[52] U.S. Cl. ......................... 425/151; 425/217; 425/308; 425/374; 425/382.3
[58] Field of Search .................................... 425/151, 217, 425/308, 374, 382.3

[56] References Cited

U.S. PATENT DOCUMENTS

| | | |
|---|---|---|
| 3,871,810 | 3/1975 | Geyer . |
| 4,353,967 | 10/1982 | Hungerford . |
| 4,927,482 | 5/1990 | Capelle . |
| 5,030,079 | 7/1991 | Benzing, II . |

OTHER PUBLICATIONS

Abstract of Japan 59–11,221 (Published Jan. 20, 1984).

*Primary Examiner*—Leo B. Tentoni
*Attorney, Agent, or Firm*—Baker & Botts, L.L.P.

[57] ABSTRACT

The invention relates to an extrusion head (3) for manufacturing a product made of a rubber compound, provided with an inlet passage (41) for said rubber compound to pass into an accumulation chamber emerging in an extrusion orifice (6) through which said rubber compound is forced and which includes a wall (8) acting cooperatively with a rotating roller (7) in order to define the profile of the product, the extrusion head (3) comprising a coating device (15) which puts a material based on a rubber compound into the accumulation chamber (4) directly between the inlet passage (41) and the extrusion orifice (6) and distributes it on the surface of the roller (7) in order to superpose, from above, the product issuing from the inlet passage (41). The "coating" material may consist of the strands of flash coming from deflashing the edges of the extruded product, the coating device therefore constituting a flash recycling device.

The invention also relates to a device (15) for coating by superposition, intended to be mounted on an extrusion head (3) which includes a rotating roller (7).

14 Claims, 4 Drawing Sheets

EXTRUSION HEAD WITH RECYCLING DEVICE

BACKGROUND OF THE INVENTION

The present invention relates to an extruder for extruding a rubber compound to make profiled products.

Various categories of machines are known for extruding rubber. One such category comprises extruders commonly called "roller-die extruders" which make it possible to extrude, in long lengths, a product with a constant profile. This profile, i.e. the cross section of the extruded rubber product, is defined in this type of machine, on the one hand, by a roller onto which the rubber is extruded and, on the other hand, by a wall which acts cooperatively with this roller in order to define an extrusion orifice.

In the field of the manufacture of tires, profiled semifinished products consisting of rubber compounds are produced. It is sought to make the continuous production of tires more precise. This manufacturing precision depends in particular on meeting the dimensions of rubber products, the assembly of which constitutes the tire. The "conventional" roller-die extruder, that is to say one such as that described above, does not, by itself, provide such precision.

U.S. Pat. No. 3,871,810 describes a roller-die extruder which includes, upstream of the extrusion orifice, a chamber for channelling the rubber stream. This chamber consists of tooling which includes a series of successive profiles in order for the profile of the rubber compound to be precisely matched to the profile defined by the extrusion orifice. The profile of the extruded product obtained is then very precise. However, this arrangement, using complex equipment which has to be perfectly dimensioned, is, on the one hand, very expensive and, on the other hand, requires very precise adjustment. What is more, changing to the extrusion of another product of a different size becomes a lengthy and expensive operation since it is then no longer a question of just changing the stationary wall element but also the complex tooling constituting the channelling chamber.

SUMMARY OF THE INVENTION

The object of the present invention is to overcome all the abovementioned drawbacks, thereby producing an extruded product with a constant and precise profile.

The terms "downstream" and "upstream" will be used below when referring to the direction of rotation of the roller of the extruder.

The invention relates to an extruder for manufacturing a product made of a rubber compound, which extruder includes an extrusion head provided with an inlet passage for said rubber compound to pass into an accumulation chamber emerging in an extrusion orifice through which the rubber compound is forced, a wall acting cooperatively with a rotating roller in order to define the profile of the product and knives lying immediately downstream of the extrusion orifice for deflashing the edges of the extruded product, the extrusion head also comprising a device for recycling the strands of flash obtained by feeding them back into the accumulation chamber.

This novel approach, involving simple tooling, with easy adjustment, makes it possible, by trimming the edges of the extruded profiled product, to obtain a more precise profile of the extruded product. Moreover, the strands of flash removed do not impair the advantages of this arrangement since they do not constitute a loss of product because they are recycled.

In addition, a dimensional change requires, in addition to changing the wall element, only adjustment to the separation of the deflashing knives.

Moreover, this approach is also advantageous as the trimmed edges of the extruded product are always much sharper than the edges of products obtained directly at the exit of an extrusion orifice.

In order to recycle the strands of flash effectively and economically, they are fed back directly between the inlet passage and the extrusion orifice by means of the recycling device.

The invention also relates to an extrusion head for manufacturing a product made of a rubber compound, provided with an inlet passage for said rubber compound to pass into an accumulation chamber emerging in an extrusion orifice through which said rubber compound is forced and which includes a wall acting cooperatively with a rotating roller in order to define the profile of the product, the extrusion head comprising knives for deflashing the edges of the extruded product, these knives lying immediately downstream of the extrusion orifice, and a device for recycling the strands of flash obtained by feeding them back into the accumulation chamber directly between the inlet passage and the extrusion orifice.

Surprisingly, it has been discovered that this recycling device could also be used to coat, by superposition in the accumulation chamber between the inlet passage and the extrusion orifice, the extruded product with another product supplied from the outside by means of the device in the form of a "sole".

Thus the invention also relates to a device for coating by superposing an extruded product with a material based on a rubber compound, intended to be mounted on an extrusion head which includes a rotating roller, the device comprising, in succession, an element for collecting the material, which has a concave outer surface carrying convergent ribs, an element for agglomerating said material into a coherent mass, said agglomerating element having a concave outer surface of more pronounced curvature than that of the outer surface of the collecting element, and an element, consisting of a blade, for laminating and distributing this mass.

The subject of the invention also includes an extrusion head for manufacturing a product made of a rubber compound, provided with an inlet passage in an accumulation chamber emerging in an extrusion orifice through which said rubber compound is forced and which includes a wall acting cooperatively with a rotating roller in order to define the profile of the product, the extrusion head comprising a coating device which feeds material based on a rubber compound into the accumulation chamber directly between the inlet passage and the extrusion orifice and distributes it on the surface of the roller in order to superpose, from above, the product issuing from the inlet passage.

Other characteristics and advantages of the invention will be apparent on reading an embodiment of an extrusion head according to the invention, with reference to the drawings.

DESCRIPTION OF PREFERRED EMBODIMENTS

Figure 1:
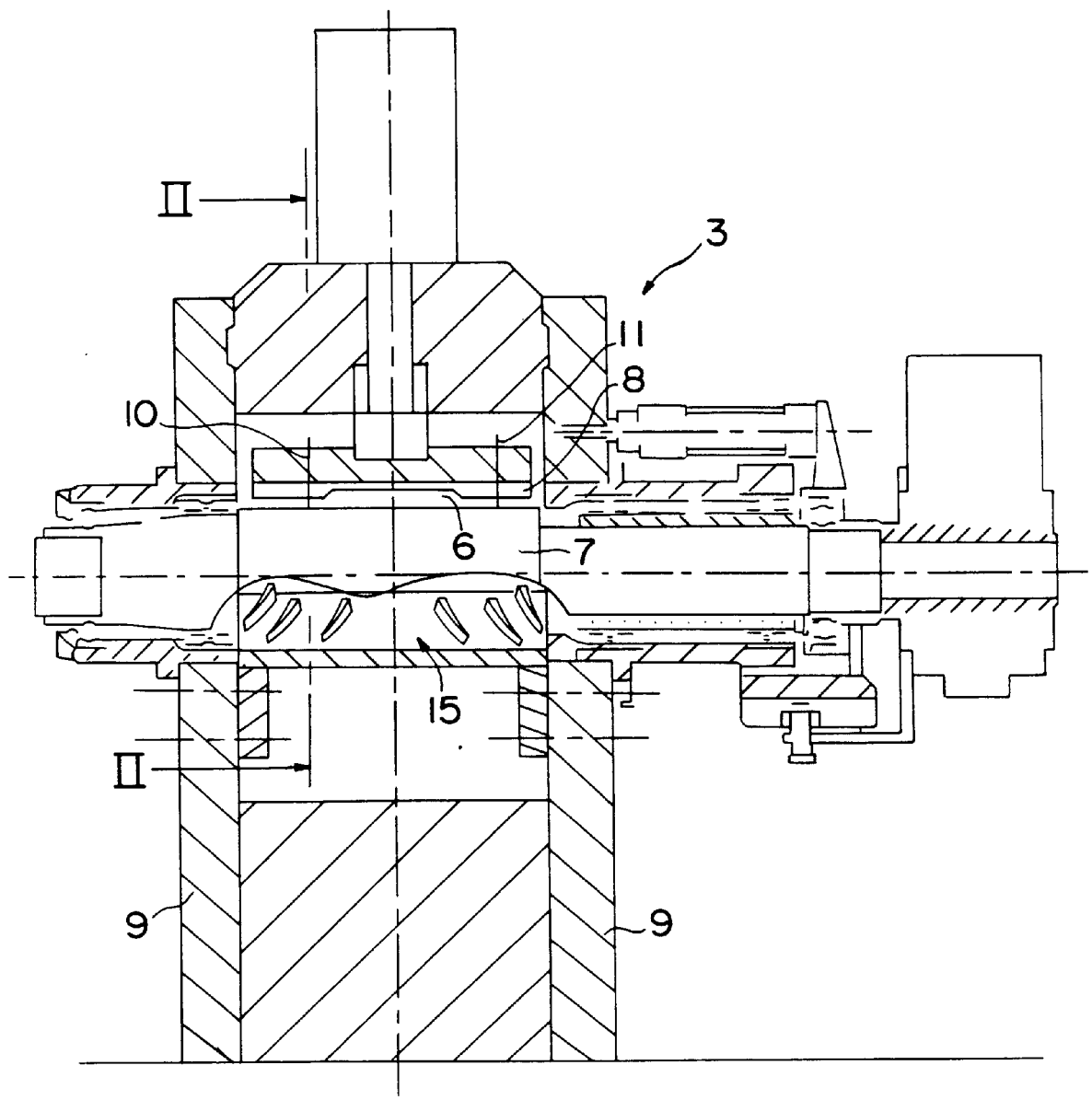
FIG. 1 is a partial section of the extrusion head along the line I in FIG. 2.

According to FIG. 1, an extruder of the roller-die type, in accordance with the invention, has an extrusion head 3. By way of example, a single-screw extruder may be chosen, said screw not being shown here. This screw makes it possible to force a rubber compound A through an inlet passage 41 into an accumulation chamber 4 within the extrusion head 3, shown in FIG. 2, and then to an extrusion orifice 6 in which said accumulation chamber emerges.

The extrusion head 3 includes a rotary roller 7 which acts cooperatively with a stationary wall 8 of the extrusion orifice 6 so as to define the profile of the product to be extruded. The desired profile is obtained, as is known for roller-die extruders, by suitably choosing the shape of the stationary wall 8 which is associated with the roller 7, the surface of which is perfectly cylindrical. Thus, when a change of size is to be effected, all that is required is to change the stationary wall 8 so that it is suitable for the new desired profile. The roller 7 and the wall 8 thus define the extrusion orifice 6 through which compound A is forced.

The roller 7 and the wall 8 are mounted between two side walls 9 carried by the extrusion head 3 and connected together by ties, not shown.

According to an alternative embodiment of the invention, it is also possible to choose not a stationary wall but a rotating wall, consisting of a second roller and acting cooperatively with the roller 7, as an embodiment example of which may be seen in Patent Application FR-A-2,700, 291.

In the present description, the "profile" of a product means the outline of the cross section of this product in a plane perpendicular to its major length. When mention is made of the tooling profile, this is the shape of the orifice through which the rubber is extruded.

Figure 2:
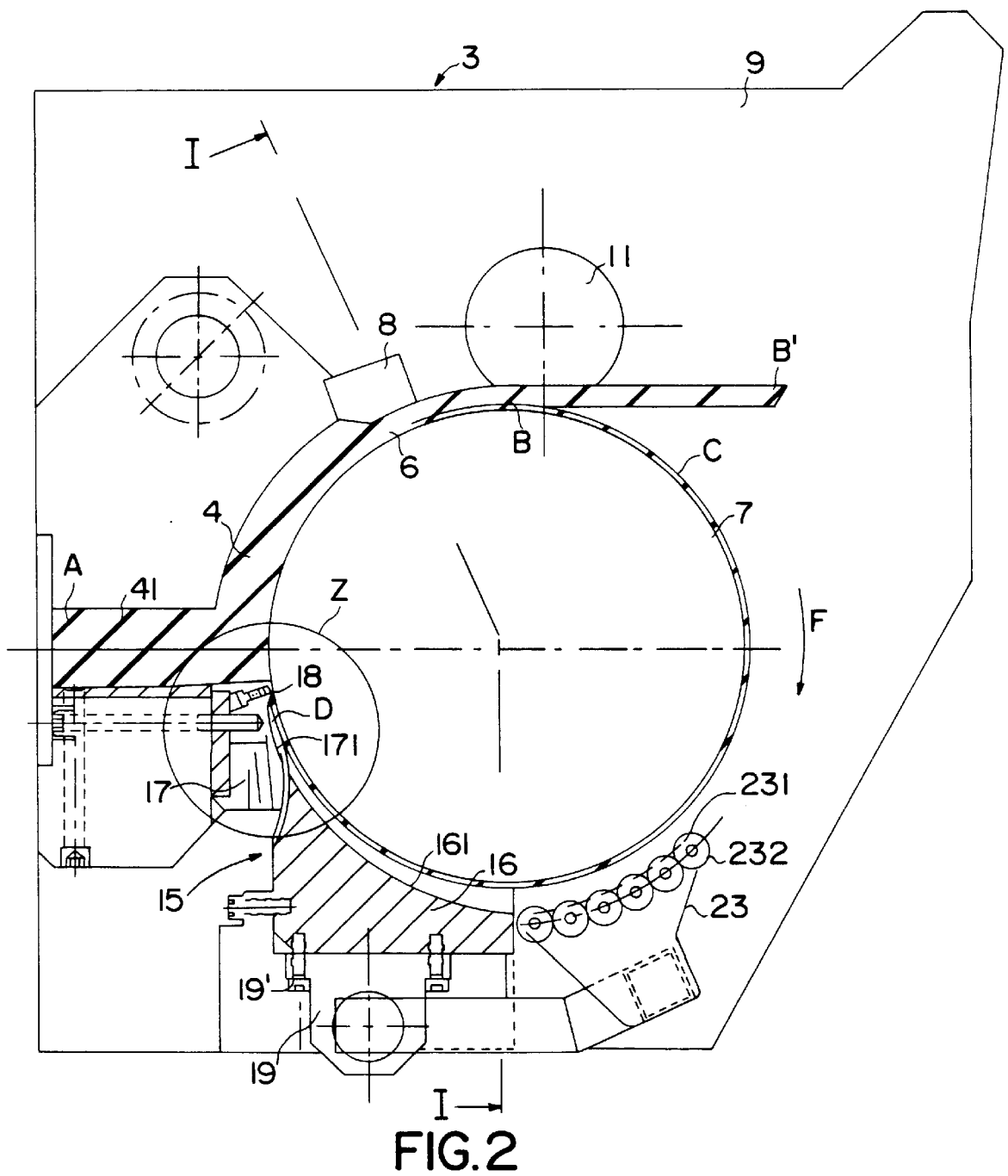
FIG. 2 is a section of the extrusion head shown in FIG. 1, along the line II in said FIG. 1.

In order to increase the precision of the profile of the extruded product B and also the sharpness of the edges of said product, deflashing knives 10 and 11 are mounted immediately downstream, with respect to the direction of rotation of the roller 7 indicated by the arrow F in FIG. 2, of the extrusion orifice 6.

These knives 10 and 11, the separation of which delimits the exact width of the profile, trim the edges of the extruded product B. Thus, this cutting operation is carried out directly on the roller 7 immediately after the extruded product leaves the extrusion orifice 6, enabling the product B' to be obtained.

In accordance with the invention, the extrusion head 3 includes a device 15 for recycling the strands of flash C produced during this deflashing operation by feeding them back into the accumulation chamber 4.

According to a first alternative embodiment of the invention, not shown, the strands of flash C are fed back as extruder input at the same time as the rubber compound is fed into said extruder, that is to say that the strands of flash C pass through the inlet passage 41 so as to enter the accumulation chamber 4 and then reach the extrusion orifice 6.

However, this approach has a few drawbacks. This is because it gives rise to a decrease in the throughput and productivity of the extruder, this decrease being proportional to the amount recycled.

In addition, in order for recycling to be continuous, the strands of flash must flow easily right to the inlet of the extruder, which assumes, so as not to break during their path, that the strands of flash have a sufficient thickness, even if this is not justified by the constraints associated with the product or with the knives.

Moreover, the temperature is a major factor to be controlled in the case of rubber extrusion so as to prevent premature vulcanization. Now, feeding back the strands of flash, the temperature of which is greater than that of the rubber compound, raises the general temperature of the compound fed into the extruder.

A second preferred alternative embodiment of the invention solves these problems. It seemed to be possible to recycle the strands of flash by feeding them back into the accumulation chamber 4 directly between the inlet passage 41 and the extrusion orifice 6, thereby meeting the uniformity of the extruded product obtained and without impairing the simplicity of the extrusion head.

This recycling device 15 is located downstream of the deflashing knives 10 and 11. It acts cooperatively with the roller 7 so as to entrain the strands of flash C as far as the extrusion orifice 6, along said roller 7, in the direction of rotation of the latter. Thus, the strands of flash C are fed back on the roller 7 upstream of the accumulation chamber 4.

Figure 3:
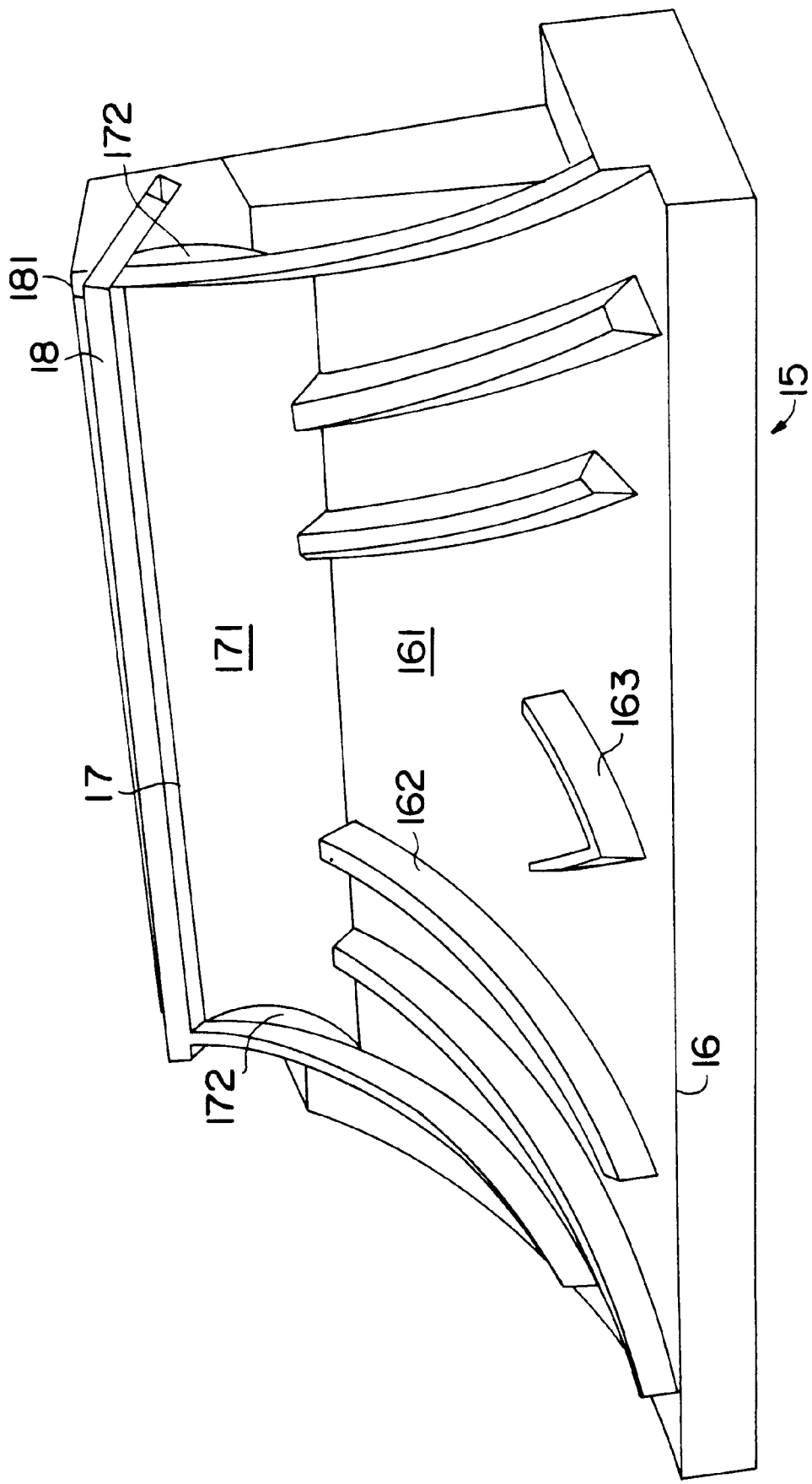
FIG. 3 is a diagrammatic perspective view of a constituent element of the extrusion head.

As shown very diagrammatically in FIGS. 2 and 3, this recycling device 15 comprises three parts acting cooperatively in succession, on going away from the deflashing knives 10 and 11, with the roller 7:

The first part consists of an element 16 for collecting the strands of flash C, ensuring that they are recentered with respect to the roller 7. This element 16 has a concave outer surface 161 of a given curvature which acts cooperatively with the roller 7 and carries ribs 162 converging toward the center of said roller 7 so as to bring the strands of flash C back toward the latter.

The outer surface 161 is approximately parallel to the surface of the roller 7 with which it acts cooperatively and is slightly spaced away from the latter outer surface so as to be as effective as possible. In the example shown in FIG. 2, this outer surface 161 converges slightly toward the roller 7 in the direction of the second part of the device 15.

This second part consists of an element 17 for agglomerating the strands of flash C into a coherent mass by the formation of a bead D. This element 17 has a concave outer surface 171 of more pronounced curvature than that of the surface 161 of the collecting element 16, allowing formation of the bead D between said surface 171 and that of the roller 7. The agglomerating element 17 also has opposite side edges 172 limiting, transversely with respect to the roller 7, the extent of the coherent mass formed.

Finally, the third part consists of an element 18 for laminating and distributing the bead D on the roller 7, this element consisting of a blade delimiting with the roller 7 a flow orifice 20 emerging in the accumulation chamber 4 between the inlet passage 41 and the extrusion orifice 6. The free edge 181 of the blade 18 thus laminates the bead D and distributes it transversely over the surface of the roller 7.

Figure 4:
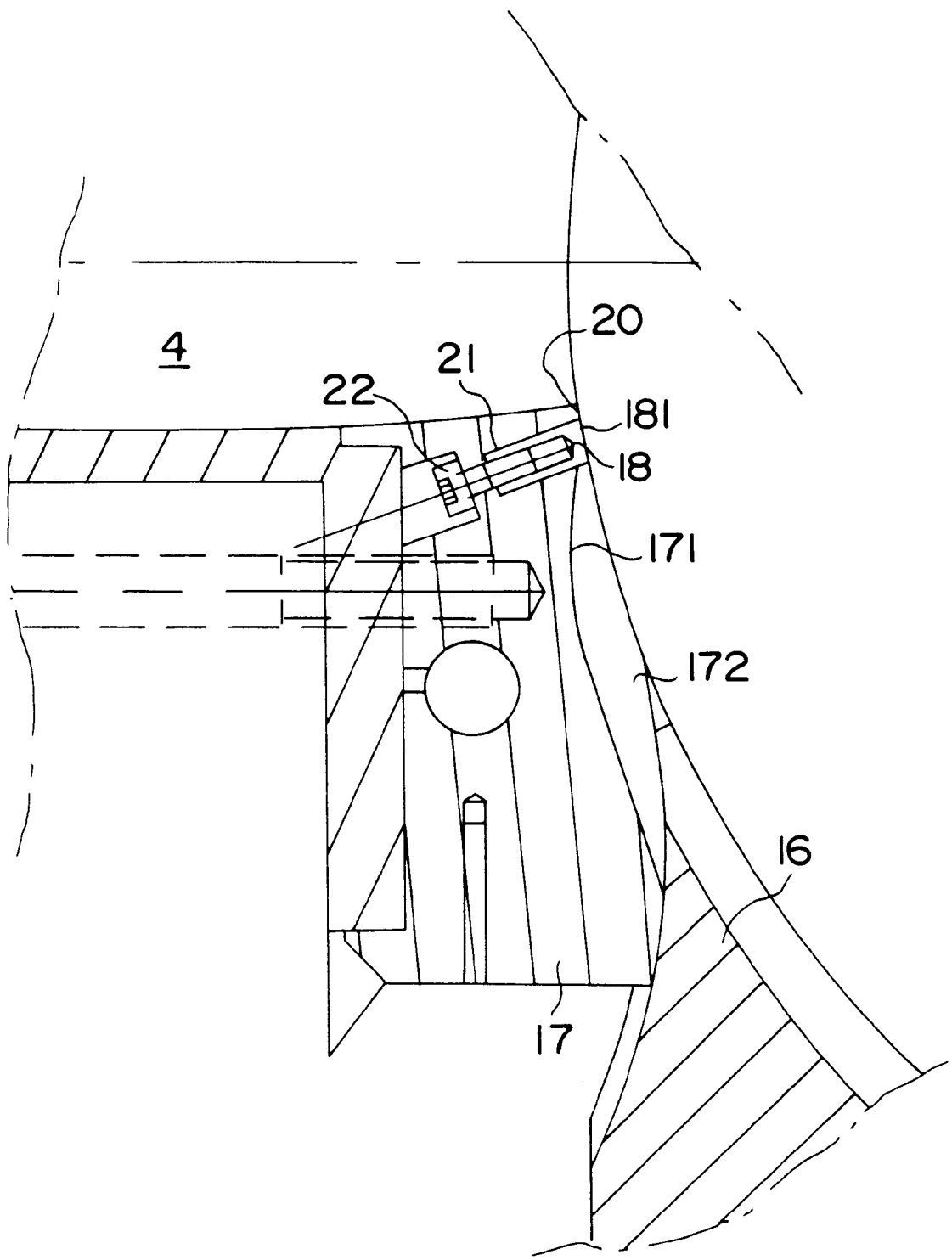
FIG. 4 is an enlargement of the detail Z shown in FIG. 2.

The blade 18 is inserted into an opening 21 made in the agglomerating element 17 and fixed in the latter by using an adjustment means 22 which is also located in said opening 21, such as a screw, which also positions the blade 18 with respect to the roller 7, maintaining an approximately constant separation between said roller 7 and the blade 18, as may be seen in FIG. 4.

In this embodiment example, the blade 18 has a straight edge 181, although it may easily be envisaged that it has another type of profile.

The device 15 is fastened to the extrusion head 3 by a support 19 mounted by means of bolts 19' on the agglomerating element and fixed laterally to the two side walls 9 by means which are not shown.

It may be envisaged to produce several extruder products simultaneously, these being juxtaposed on the roller 7, the extrusion head 3 then including as many deflashing knives as there are product edges. In such a case, the outer surface 161 of the collecting element 16 includes a V-shaped divergent central rib 163, as shown in FIG. 3, lying in the central part of said surface so as to ensure that all the strands of flash are effectively collected.

The presence of the deflashing knives 10, 11 and of the recycling device 15, because of their characteristics, helps to obtain a simple extrusion head. This recycling device 15 also makes it possible to contribute to the economic objective of the invention since, because of this system, the strands of flash C do not constitute a pure loss in terms of product and, in addition, feeding these strands of flash back directly into the accumulation chamber 4 near the extrusion orifice 6 enables the throughput of the extruder not to be modified.

This arrangement also enables the recycling to be carried out even if the strands of flash are very fine. Thus, the device 15 does not lead to any particular constraints with regard to the strands of flash produced, the size of which depend only on the product or on the knives.

Moreover, it is advantageous to provide, as shown in FIG. 2, upstream of the recycling device 15, a safety device 23 for protecting the user from the danger of the reentrant angle formed between the collecting element 16 and the roller 7. This device 23, also fixed to the side walls 9, has an outer surface 231 acting cooperatively with the roller 7, having a detector, not shown, which, for example, causes the extrusion to stop if an operator passes his hand between the surface 231 and the roller 7.

This surface 231 is advantageously equipped with small wheels 232 of axis of rotation parallel to that of the roller 7, facilitating entrainment of the strands of flash toward the recycling device 15.

The operation of the extrusion head 3 will be briefly described below with reference to FIG. 2.

A rubber compound A is forced through the inlet passage 41 into the accumulation chamber 4 as far as the extrusion orifice 6, the stationary wall 8 of which makes it possible, by acting cooperatively with the roller 7 which entrains the compound, to produce the profile of the product to be extruded.

On exiting the extrusion orifice 6, the extruded product B is deflashed using the knives 10 and 11 which trim the edges of the latter. The product B' thus obtained is taken off the roller 7 and entrained over a second roller, not shown. Of course, other means of entraining the product B' may be envisaged.

The strands of flash C formed during this deflashing operation remain on the roller 7. This is because it is known that rubber compounds exhibit not inconsiderable tack in the green state. It is therefore not necessary to carry out an additional operation for making the strands of flash remain attached to the roller 7, the strands of flash therefore following the rotation of said roller 7.

The strands of flash C are thus guided, being optionally assisted by the small wheels 232 of the safety device 23, as far as the collecting element 16 and come into contact with the ribs 162 which bring them back to the center of the roller 7, while continuing to follow the rotation of the latter.

The strands of flash C then reach the agglomerating element 17. Since the latter has an outer surface 171 of more pronounced curvature than that of the collector and therefore than that of the roller 7, the strands of flash C are amassed between the surface 171 and the roller 7. This is because the narrowness of the passage orifice 20 which follows prevents the strands of flash C from continuing their path directly along the roller 7. Thus, the strands of flash C are wound together, by intermingling, and constitute a bead D.

However, the orifice 20 does not prevent entire passage of the compound, but this takes place only after the bead D has been laminated by the blade 18. The latter simultaneously distributes this mass of strands of flash over the roller 7 in the form of a very thin surface. Of course, the high pressure exerted by the bead D on the blade 18 requires a backpressure produced by the holding means 22. This enables a very narrow orifice 20 to be maintained between the roller 7 and the blade 18.

All the strands of flash C are thus fed back into the accumulation chamber 4 between the inlet passage 41 and the extrusion orifice 6 and distributed in the form of a very thin sole entrained by the roller 7. Coating then occurs by superposition on top of this sole of the rubber compound issuing from the inlet passage 41. The extruded and trimmed product B' therefore has a thin sole consisting of the recycled product.

The setting of the orifice 20, between the blade 18 and the roller 7, is therefore fixed depending on the amount of recycled product allowed to be fed back into the extruded product.

It has been discovered, surprisingly, that this recycling device 15, which thus carries out coating by superposition of the strands of flash with the extruded product, could also be advantageously used, as a device for coating by superposition of the extruded product, by another material based on a rubber compound, independently of any aspect of recycling.

In this embodiment of the invention, the coating device is absolutely identical to the recycling device 15 described previously. The second coating material is supplied from outside the extrusion head 3 between the roller 7 and the device 15. The safety device 23 may also advantageously be present.

The extrusion head 3 carrying such a coating device is also identical to that described previously and may or may not include deflashing knives. If the latter are present, the strands of flash obtained may, depending on the amount of them and the nature of the coating material, be recycled by coating, by mixing with the external material or be fed back as input into the extruder.

I claim:

1. A device for coating by superposing an extruded product with a material based on a rubber compound, intended to be mounted on an extrusion head which includes a rotating roller, the device comprising, in succession, an element for collecting the material, which has a concave outer surface carrying convergent ribs, an element for agglomerating said material into a coherent mass, said agglomerating element having a concave outer surface of more pronounced curvature than that of the outer surface of the collecting element, and an element, including a blade, for laminating and distributing this mass.

2. A device according to claim 1, characterized in that the concave outer surface of the collecting element carries a divergent central rib.

3. A device according to claim 1, characterized in that the concave outer surface of the collecting element is approximately parallel to the outer surface of the roller, with which it acts cooperatively to define a passage for the collected material.

4. A device according to claim 1, characterized in that the agglomerating element has opposite side edges limiting, transversely with respect to the roller, the extent of the coherent mass formed.

5. A device according to claim 1, characterized in that the blade is defines with the roller a flow orifice.

6. A device according to claim 1, characterized in that the blade is inserted into an opening made in the agglomerating element and in that a means for adjusting the position of the blade, located in said opening, ensures that there is an approximately constant separation between the blade and the roller.

7. An extrusion head for manufacturing a product made of a rubber compound, provided with an inlet passage for said rubber compound to pass into an accumulation chamber emerging in an extrusion orifice through which said rubber composition is forced and which includes a wall acting cooperatively with a rotating roller in order to define the profile of the product, the extrusion head comprising knives for deflashing the edges of the extruded product, these knives lying immediately downstream of the extrusion orifice, and a device for recycling the strands of flash obtained by feeding them back into the accumulation chamber directly between the inlet passage and the extrusion orifice, said device including a coating device according to claim 1.

8. An extrusion head according to claim 7, characterized in that the strands of flash are fed back on the roller upstream of the accumulation chamber.

9. An extrusion head according to claim 7, characterized in that the recycling device is located downstream of the deflashing knives and in that it acts cooperatively with the roller so as to entrain the strands of flash as far as the extrusion orifice, along said roller, in the direction of rotation of the latter.

10. An extrusion head according to claim 7, characterized in that the recycling device distributes the compound composed of the strands of flash on the surface of the roller in order to superpose, from above, the product issuing from the inlet passage.

11. An extrusion head according to claim 7, characterized in that it includes a safety device equipped with small wheels of axis of rotation parallel to that of the roller, facilitating the entrainment of the strands of flash toward the recycling device.

12. An extruder for manufacturing a product based on a rubber compound, which includes an extrusion head provided with an inlet passage for said rubber compound to pass into an accumulation chamber emerging in an extrusion orifice through which the rubber compound is forced and which includes a wall acting cooperatively with a rotating roller in order to define the profile of the product, knives for deflashing the edges of the extruded product lying immediately downstream of the extrusion orifice, the extrusion head comprising a device for recycling the strands of flash obtained by feeding them back into the accumulation chamber, said device including a coating device according to claim 1.

13. An extrusion head for manufacturing a product based on a rubber compound, provided with an inlet passage for said rubber compound to pass into an accumulation chamber emerging in an extrusion orifice through which said rubber compound is forced and which includes a wall acting cooperatively with a rotating roller in order to define the profile of the product, the extrusion head comprising a coating device, according to claim 1, feeding material based on a rubber compound into the accumulation chamber directly between the inlet passage and the extrusion orifice and distributing it on the surface of the roller in order to superpose, from above, the product issuing from the inlet passage.

14. An extrusion head according to claim 13, characterized in that it includes, upstream of the coating device, a safety device equipped with small wheels of axis of rotation parallel to that of the roller, facilitating entrainment of the material toward said coating device.

* * * * *

UNITED STATES PATENT AND TRADEMARK OFFICE
CERTIFICATE OF CORRECTION

PATENT NO. : 5,935,619

DATED : August 10, 1999

INVENTOR(S) : Gérard Crosnier

It is certified that error appears in the above-identified patent and that said Letters Patent is hereby corrected as shown below:

Column 7, claim 5, line 6: delete "is".

Signed and Sealed this

Thirtieth Day of January, 2001

Attest:

Q. TODD DICKINSON

*Attesting Officer*  *Director of Patents and Trademarks*